Dec. 26, 1961 R. E. WILSER ET AL 3,014,654

RANDOM STORAGE INPUT DEVICE

Filed April 20, 1956 3 Sheets-Sheet 1

INVENTORS
RAYMOND E. WILSER
HARRY M. LAWRENCE

BY Joe L. Koerber

ATTORNEY

RANDOM STORAGE INPUT DEVICE

Filed April 20, 1956 3 Sheets-Sheet 2

INVENTORS
RAYMOND E. WILSER
HARRY M. LAWRENCE
BY Joe L. Koerber
ATTORNEY

Dec. 26, 1961 R. E. WILSER ET AL 3,014,654

RANDOM STORAGE INPUT DEVICE

Filed April 20, 1956 3 Sheets-Sheet 3

United States Patent Office 3,014,654
Patented Dec. 26, 1961

3,014,654
RANDOM STORAGE INPUT DEVICE
Raymond E. Wilser, United States Army, and Harry M. Lawrence, Ware Neck P.O., Va., assignors to International Business Machines Corporation, New York, N.Y., a corporation of New York
Filed Apr. 20, 1956, Ser. No. 580,430
7 Claims. (Cl. 235—61.11)

This invention relates to a data signal transmission system and more particularly to a device for reading data from a record and for transmitting the read data as well as identifying data indicating the particular record, the portion of that record and the particular device from which the data was read where more than one reading device is used.

In certain types of data signal transmission systems, it is oftentimes desirable to incorporate in the transmission system a time buffer, for example, a magnetic drum storage device. A time buffer in a data transmission system permits a high speed data source and a low speed data receiver or a low speed data source and a high speed data receiver to be interconnected. The novel apparatus described and claimed herein is a relatively low speed data source. In the magnetic drum storage with which this data source is used, the average access time for storing information on the drum is a function of the empty or full status of the registers on the drum and the probability of substantially immediate access to the drum is very high. The average access time for reading information from the drum of the storage system also is a function of the empty or full status of the registers on the drum. Such a magnetic drum storage system is particularly useful as a time buffer between a data source and data load in which the data source has a data rate varying from a high rate to a low rate. However, over relatively long periods of time the average data rate is substantially uniform.

An object of this invention is to provide an improved data input for data storage devices.

Another object of this invention is to provide an improved data input to a random type storage unit.

Yet another object of this invention is to provide a data input device for a random type storage unit that identifies the record from which the data originated.

A further object of the invention is to provide a data input device that identifies the particular portion of the record from which the data originated.

Still a further object of the invention is to provide a data input device that identifies the data source where there are two or more data sources.

A still further object of the invention is to provide a data input device that indicates when data has been read from a record and is ready for storage.

Other objects of the invention will be pointed out in the following description and claims and illustrated in the accompanying drawings, which disclose, by way of example, the principle of the invention and the best mode, which has been contemplated, of applying that principle.

In the drawings

Figure 1:
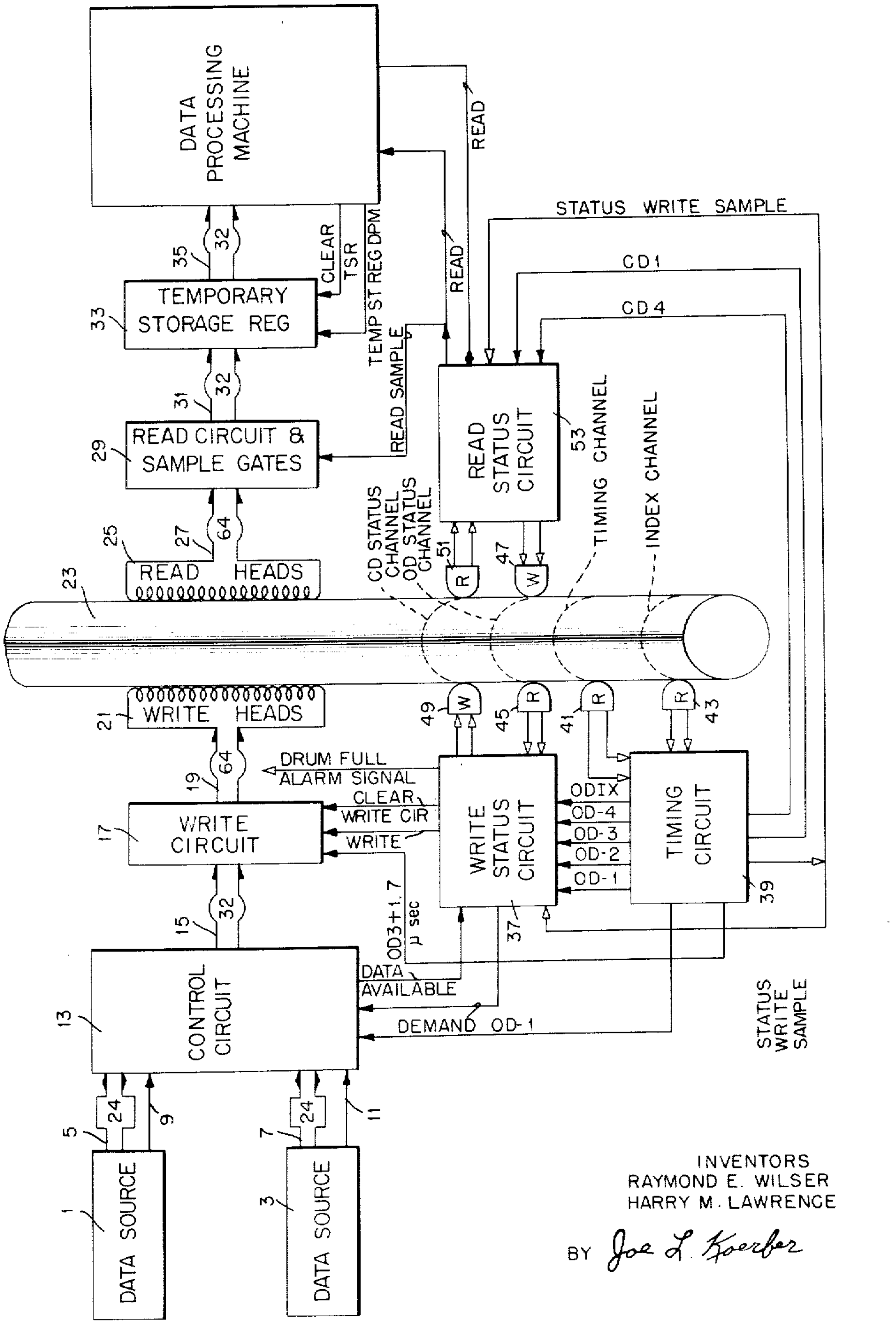
FIGURE 1 is a simplified block representation of a data signal transmission system.

FIGURE 1 is a schematic representation of a magnetic data storage system which is described in detail in the copending application No. 494,982, now Patent No. 2,988,735, filed March 17, 1955, on behalf of Robert R. Everett et al. The novel apparatus claimed hereinafter is the Data Source designated 1 and 3, shown in FIGURE 1 of this application and the above cited copending application. The details of the circuits of the data storage system are not necessary to the complete disclosure of the data source and therefore are not described herein. Reference may be had to the cited application for details of the storage system.

GENERAL DESCRIPTION

Referring to FIG. 1, the general function of the Data Sources 1 and 3 is to supply signals to Control Circuit 13 that are representative of particular data, the card column from which the data originated, the card within a five-card group from which the data originated and the Data Source, 1 or 3, from which the data originated, as well as a synchronizing pulse indicating that data has been read and is ready for storage on a drum 23.

The numbers 24, located between the pairs of lines 5 and 7 that represent conductor cables in FIG. 1, indicate that there are twenty-four lines in each of the cables 5 and 7. The part numbers and word designations used in the copending application are retained herein for clarity, as shown in FIG. 1. The Data Sources 1 and 3 are identical and therefore only Data Source 1 is shown in detail in FIG. 3, whereas Data Source 3 is shown in block form.

The card reader handles record cards perforated in accordance with the well-known Hollerith code. An auxiliary drum record card referred to hereinafter may be identical in size to the Hollerith punched cards and is perforated in accordance with a binary code utilizing seven recording rows of the card. It will be apparent that codes other than Hollerith and binary may be used by making suitable changes within the scope of the invention.

It may be reasonably assumed that the buffer storage drum 23 has speed and capacity sufficient to assure that data will be accepted by the drum as rapidly as it is presented by the Data Sources. The pertinent requirement placed upon the data sources is that the conductors of the cables 5 and 7 must normally be at a D.C. level of —30 volts and, to designate data bits, must be raised to a D.C. level of +10 volts. The Data Source 1 (or 3) has a synchronizing line 9 (or 11) that is pulsed to indicate that D.C. levels indicative of sensed data have been established on the conductors of the cables 5 (or 7). Therefore, Data Source 1 is described in detail to the point where the +10 or —30 volt D.C. levels are established on the conductors of the cable 5 (or 7) and the synchronizing conductor 9 (or 11) leading to Control Circuit 13, shown in FIG. 1 of this application and of the above cited copending application.

Control Circuit 13 is a circuit capable of performing the following functions: (1) in response to a synchronizing signal on the conductor 9, followed by a drum synchronizing signal on the conductor OD–1, followed by a Demand signal on the conductor labeled Demand, Control Circuit 13 produces pulses on particular ones of twenty-four conductors of the cable 15, which correspond to the conductors of the cable 5 having positive D.C. levels established thereon, and produces pulses on the remaining 8 conductors of the cable 15 indicating that the pulses on the twenty-four conductors of the cable 15 are being transferred from Data Source 1; (2) in response to a synchronizing signal on the conductor 11 (provided that no data is immediately available for transfer from Data Source 1), followed by a drum synchronizing signal on the conductor labeled OD–1, followed by a Demand signal on the conductor labeled Demand, Control Circuit 13 produces pulses on particular ones of the twenty-four conductors of the cable 15, which correspond to the conductors of the cable 7 having positive D.C. levels established thereon, and produces pulses on the remaining 8 conductors of the cable 15 indicating that the pulses on the twenty-four conductors of the cable 15 are being transferred from Data Source 3; (3) Control Circuit 13 produces a pulse on the conductor labeled Data Available provided that, when a Demand pulse is received, data is available to be transferred from Data Source 1 or Data Source 3. Each of the thirty-two conductors of the cable 15 is connected to a corresponding Write Circuit 17.

Briefly summarizing what has been stated with respect to the general arrangement, a pulse on the conductor labeled Demand, will cause the positive D.C. level data signals on the conductors of the cable 5 or the conductors of the cable 7 to be transformed in Control Circuit 13 into data pulses which are accompanied by identification pulses. Those data pulses and identification pulses are applied to the Write Circuits 17, where, in response to a pulse on a conductor labeled Write those pulses are transformed into Write signals for recording on the drum 23.

*Card reader*

Figure 2:
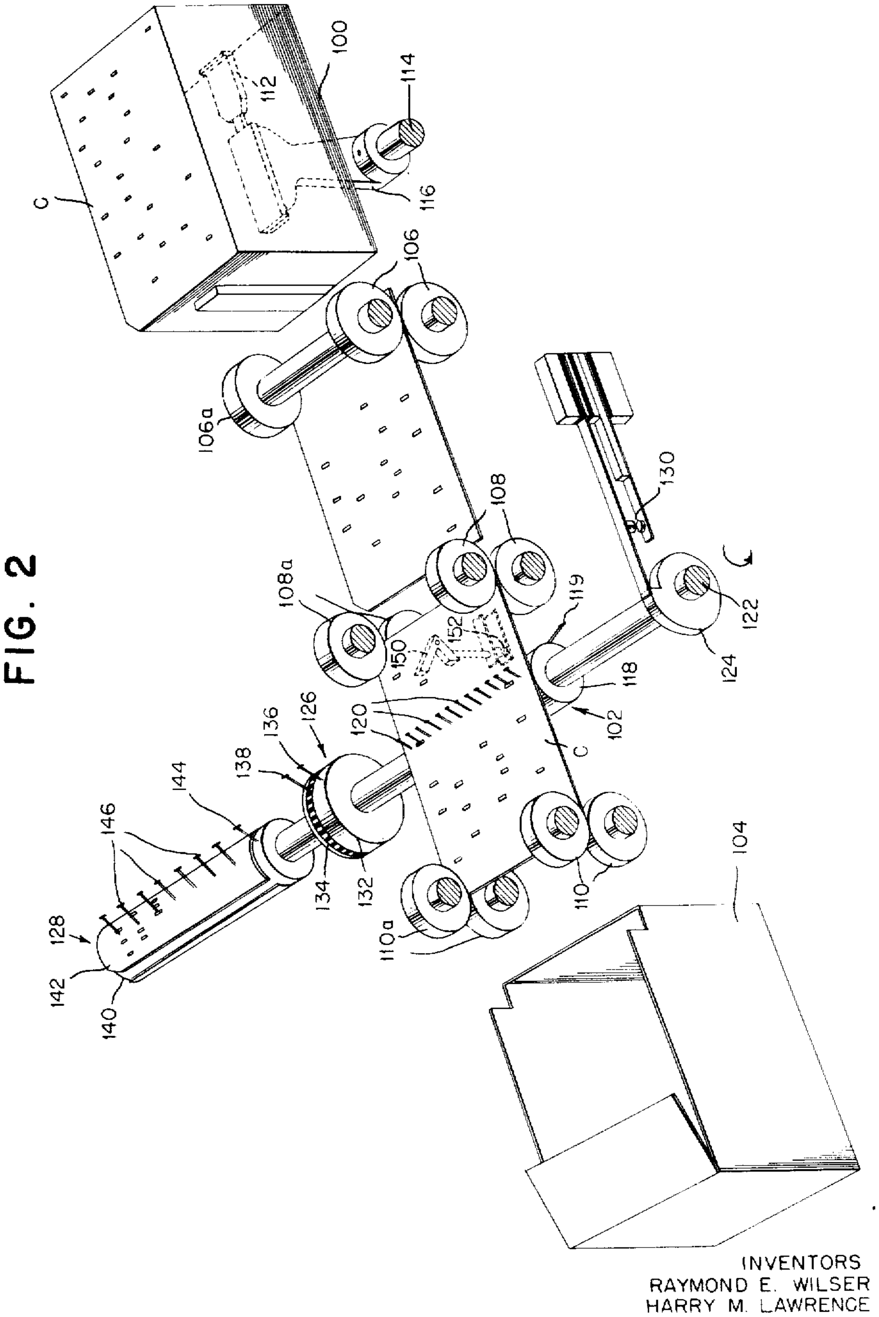
FIGURE 2 is a schematic representation of a card feeding and sensing mechanism.

Referring to FIG. 2, the card reader is schematically shown comprising a card feed hopper 100, a card sensing station 102, and a stacker pocket 104. Pairs of driven card feed rollers 106, **106*a*, 108, 108*a*, 110, and 110*a*, are shown for feeding cards from the hopper 100 past the sensing station 102 to the stacker pocket 104. A conventional card feed knife 112 is provided for feeding cards C, one at a time, from the bottom of the card hopper 100. The knife 112 is reciprocated by a driven shaft 114 through an arm 116. The sensing station 102 includes a driven contact roll 118, a common brush 119 and twelve sensing brushes 120, one brush for each recording row of a card C. The contact roll 118 is rotated by a driven shaft 122. Also on the shaft 122 are a cam 124, a column emitter 126, and an auxiliary drum unit 128. The cam 124 cooperates with a pair of contacts 130 and is adapted to maintain the contacts 130 closed while a card C is at the sensing station 102 and to open the contacts 130 between successive cards. The column emitter 126 consists of a common ring 132 and a segmented ring 134 having a conducting segment corresponding to each card column. The segments are separated one from the other by insulating material and are connected to the common ring 132. As the column emitter 126 rotates, circuits are successively completed from a common brush 136 through a particular segment of the ring 134 to a brush 138. The auxiliary drum unit 128 comprises a contact roll 140 adapted to hold a record card 142 wrapped therearound, having its 80 recording columns perforated in accordance with a binary code to represent the respective column numbers. A connection is made to the contact roll 140 through a common brush 144 and data designations in the card 142 are sensed by seven brushes 146. When column one of a card C, then at the sensing station 102, is being sensed by the brushes 120, the binary coded number one in column one of the card 142 in the auxiliary drum unit is being sensed by the brushes 146. Similarly, when the brushes 120 sense column two of the card C, the brushes 146 sense the binary coded number two in column two of the card 142, etc. A card lever 150 is positioned to actuate a pair of contacts 152 each time a card C enters the sensing station 102**.

Figure 3:
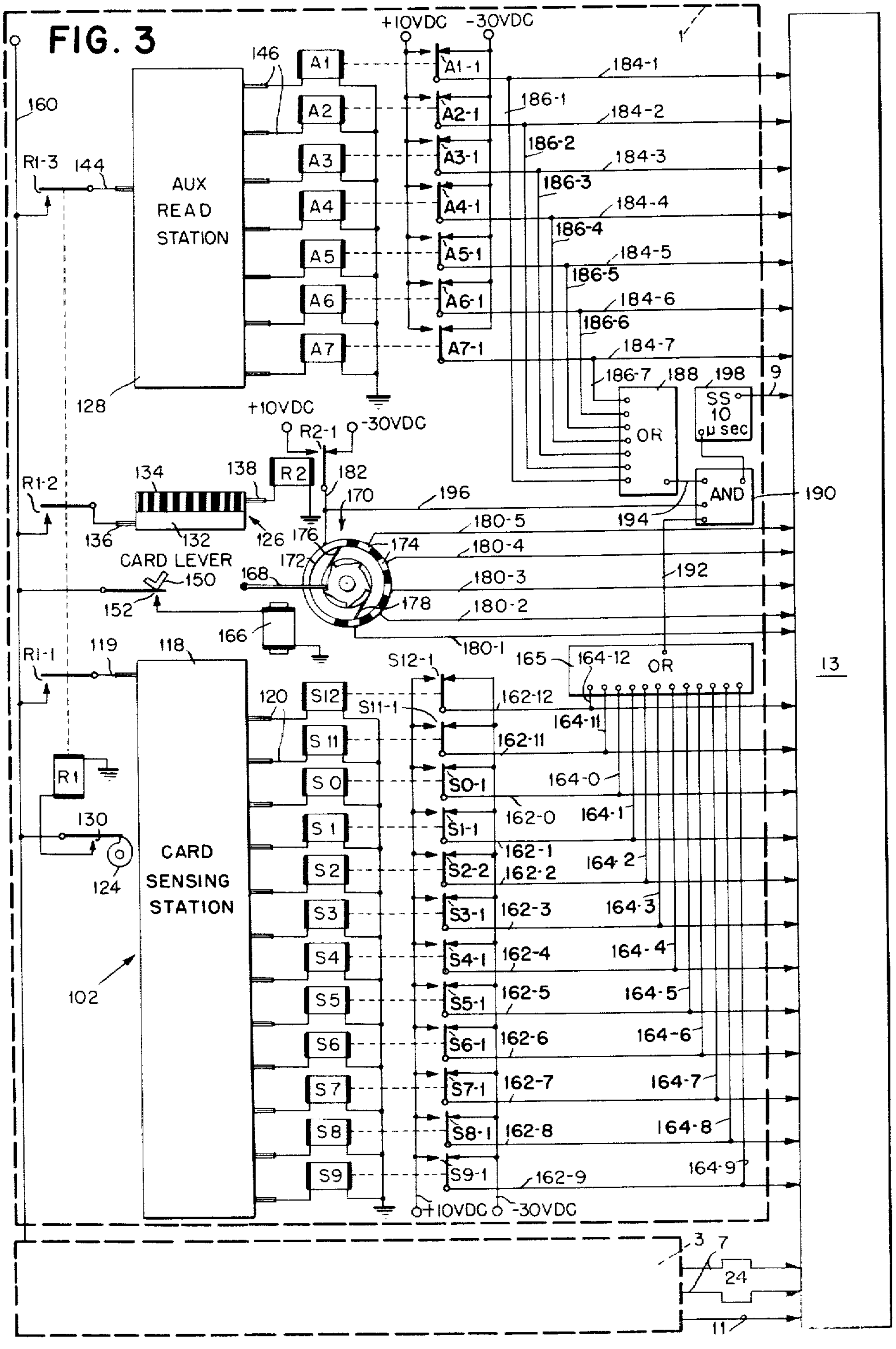
FIGURE 3 is a circuit schematic.

Referring to FIGURE 3, the sensing station 102, the auxiliary drum unit 128, the emitter 126, and the card lever 150, are shown with the associated brushes and contacts. When a card C is fed to the sensing station 102 and the contacts 130 close, a relay R1 is picked up closing three relay points R1–1, R1–2, and R1–3 thereby connecting the common brushes 119, 136 and 144 to a positive potential line 160. Each of the twelve sensing brushes 120 is connected through an associated relay coil S to ground. The relays are numbered S0 through S9 and S11 and S12. Each of the twelve relays S has associated contact points designated S0–1 through S12–1, and comprising a common point, a normal point and a transfer point. The transfer points of the twelve sets of relay points are common connected to a +10 volt D.C. supply, and the normal points are common connected to a −30 volt D.C. supply. The common points are connected to output lines designated 162–0 through 162–12. The conductors 162 are part of the cable 5 shown in FIG. 1. The lines 162 are connected to Control Circuit 13. Each of the lines 162–0 through 162–12 is connected through a corresponding line designated 164–0 through 164–12 to a 12-way OR unit 165. The unit 165 may be of conventional design, responding to a positive input and emitting a positive output.

Each time a card C is fed to the sensing station 102, the card lever 150 closes the contacts 152 completing a circuit from the line 160 through the contacts 152 and the coil of an electromagnet 166 to ground. Each time the electromagnet 166 is actuated, it attracts its armature 168 thereby stepping a conventional five-position stepping switch 170 that is schematically shown in FIG. 3. The switch 170 comprises a common segment 172, five individual segments 174 and two rotating contact brushes 176 and 178. The five segments 174 are connected to Control Circuit 13 by lines designated 180–1 through 180–5. The lines 180 also are part of the cable 5. The common segment 172 is connected through a line 182 and normally closed relay contacts R2–1 to a −30 volt D.C. supply. The transfer point of the contacts R2–1 is connected to a +10 volt D.C. supply. The brush 138 of the column emitter 126 is connected through the coil of the relay R2 to ground and each time a segment 134 of the column emitter is contacted by the brush 138, the relay R2 picks up, transferring its points R2–1 and placing a +10 volt D.C. level on one of the lines 180–1 through 180–5 that is currently connected to the line 182 through the brushes 176 and 178 and the common segment 172. The column emitter circuit is from the line 160, through the contacts R1–2, the common brush 136, the common ring 132, a segment of the ring 134, the brush 138 and the relay coil R2 to ground.

Referring to the auxiliary drum unit 128, shown in FIGURE 3, the brushes 146 are connected through the coils of seven relays designated A1 through A7 to ground. The normal points of the relays A1–1 through A7–1 are connected, in a manner similar to that for the relay points S0–1 through S12–1, to a −30 volt D.C. supply and the transfer points to a +10 volt D.C. supply. The common points of the relay contacts A1–1 through A7–1 are connected through respective lines 184–1 through 184–7 to Control Circuit 13. The lines 184–1 through 184–7 are part of the cable 5 and are connected by respective lines 186–1 through 186–7, to a 7-way OR unit 188 differing from the OR unit 165 only in the number of input terminals. The outputs of the OR units 165 and 188 are fed to a 3-way AND unit 190 through respective lines 192 and 194. The AND unit 190 may be of conventional design, responding to positive inputs and emitting a positive output. The third input to the AND unit 190 is from the line 182 through a line 196. When a column of data is read, the column data is set up in the relays S0 through S12 and the column count is set up in the relays A1 through A7. The column emitter 126 emits a pulse for each card column. The OR unit 165 responds to positive inputs, and it will be apparent that the OR unit 165 will not emit an output until one of the relay points S is transferred thereby connecting an associated one of the lines 162 to the +10 volt D.C. supply. Similarly the OR unit 188 will not emit an output until one of the relay points A is transferred thereby connecting an associated line 184 to the +10 volt D.C. supply. When the OR units 165 and 188 emit outputs through the respective lines 192 and 194 to the AND unit 190, and the potential of the line 196 is raised due to the picking of the relay R2, through the emitter 126, the AND unit 190 emits an output to a ten microsecond delay single shot multivibrator 198 which may be of conventional design. The output of the unit 198 is fed to the control unit 13 through the line 9.

The card lever 150 is actuated once for each card that enters the sensing station 102. For each card that actuates the lever 150, the electromagnet 166 steps the brushes 176 and 178 of the unit 170 one step thereby connecting successive ones of the segments 174 with the common segment 172. For each column of a card, the relay R2 is picked, as described hereinbefore, and the common segment 172 is connected to the +10 volt D.C. supply. The positions of the brushes 176 and 178 are indicative of a card count, within a five-card group and, through the lines 180–1 through 180–5, the card count is transmitted to Control Circuit 13.

In the manner described hereinbefore and in the above cited application No. 494,982, the raising of the D.C. levels of the lines 162, 180, and 184 is effective to record, on the magnetic buffer storage drum 23, the data sensed by the brushes 120, the column count sensed by the brushes 146 and the card count set up by the stepping switch 170. Raising the potential of the line 9 is effective as a synchronizing pulse and as an indication that the data originated at Data Source 1. Data from Data Source 3 is identified as to source by raising the potential of the line 11 which corresponds to the line 9 of Data Source 1.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. A data input device for translating data stored on data bearing records into electrical signals for transmission to data processing equipment, each of said records bearing data indicia coordinately arranged thereon, comprising, in combination, an electrical sensing device adapted to sense said data indicia, record feeding means adapted to feed said records serially past said sensing device, said sensing device including means adapted to produce signals representative of the data stored in each sensed record, means for concurrently producing, independently of indicia on said records, signals representative of the coordinate location of said sensed data on said record and a record identity signal, and transmission means adapted to transmit identity, location and data signals in associated relationship to said data processing equipment.

2. A data input device for translating data stored on data bearing records into electrical signals for transmission to data processing equipment, each of said records bearing data indicia coordinately arranged thereon comprising, in combination, an electrical sensing device adapted to sense said data indicia, record feeding means adapted to feed said records serially past said sensing device, said sensing device including means adapted to produce signals representative of the data stored in each sensed record, means operating synchronously with said record feeding means for concurrently producing, independently of indicia on said records, signals representative of the coordinate location of said sensed data on said record, a record identity signal, and a sensing device identity signal, means for signalling data availability when related identity, location and data signals have been produced, and transmission means adapted to transmit identity, location and data signals in associated relationship to said data processing equipment.

3. A data input device for translating data stored on data bearing records into electrical signals for transmission to data processing equipment, each of said records having data indicia arranged thereon in a plurality of columns, comprising, in combination, an electrical sensing device adapted to sense said data indicia column by column, record feeding means adapted to feed said records serially past said sensing device, said sensing device including means adapted to produce signals representative of the data stored in each column of the sensed record, means for concurrently producing independently of indicia on said records, signals representative of each column of sensed data and a record identity signal, means for signalling data availability when related record identity, column and data signals have been produced and transmission means adapted to transmit data signals, column signals and record identity signals in associated relationship to said data processing equipment.

4. A data input device for translating data stored on punched cards into electrical signals for transmission to data processing equipment, each of said punched cards having data indicia comprising a multiplicity of holes arranged thereon in a plurality of columns, comprising, in combination, an electrical sensing device adapted to sense said data indicia column by column, card feeding means adapted to feed said cards serially past said sensing device, said sensing device including means for producing signals representative of the data stored in each column of the sensed card, means operating synchronously with said card feeding means for concurrently producing, independently of indicia on said cards, signals representative of each column of sensed data, a card identity signal associated with each card and a sensing device identity signal, means for signalling data availability when the related data signals, column signals and identity signals have been produced, and transmission means adapted to transmit related data signals, column signals and identity signals in associated relationship to said data processing equipment.

5. A data input device for data processing apparatus, comprising, in combination, means for sensing the data indicia recorded on data records, means for successively feeding data bearing records past said sensing means to present the data on each said record to said sensing means in successive groups, said sensing means constructed and arranged to simultaneously sense all of the data in each of said data groups successively presented thereto and produce signals representative of said data, means for concurrently producing, independently of any data indicia on said records, signals identifying the particular record and the coordinate location on said record of each data group sensed by said sensing device, and transmission means for transmitting all of said signals corresponding to a given data group in predetermined relation to said apparatus.

6. The device of claim 5 wherein said apparatus comprises data signal recording equipment and said transmission means is arranged to transmit said signals simultaneously to said equipment for recording as a unit.

7. The device of claim 5 which also includes means for providing to said apparatus a data availability signal when each group of related identity, location and data signals have been produced.

References Cited in the file of this patent

UNITED STATES PATENTS

| | | |
|---|---|---|
| 1,882,796 | Ford | Oct. 18, 1932 |
| 2,679,638 | Bensky | May 25, 1954 |
| 2,702,380 | Brustman | Feb. 15, 1955 |
| 2,757,864 | Pollard | Aug. 7, 1956 |
| 2,771,595 | Hendrickson | Nov. 20, 1956 |
| 2,782,398 | West | Feb. 19, 1957 |
| 2,832,063 | McMillan | Apr. 22, 1958 |
| 2,902,214 | Donan | Sept. 1, 1959 |
| 2,902,217 | Davis | Sept. 1, 1959 |